May 2, 1950 — L. H. BROWNE — 2,506,133

EPICYCLIC DRIVE

Filed Sept. 20, 1946

INVENTOR
LINDSAY H. BROWNE
BY
Van Deventer & Grier,
ATTORNEYS

Patented May 2, 1950

2,506,133

UNITED STATES PATENT OFFICE 2,506,133

EPICYCLIC DRIVE

Lindsay H. Browne, Westport, Conn., assignor to American Brake Shoe Company, a corporation of Delaware Application September 20, 1946, Serial No. 698,154

18 Claims. (Cl. 74—801)

1

This application relates to improvements in Epicyclic drives and is a continuation in part of copending application Serial No. 503,241, filed September 21, 1943, now Patent No. 2,427,253, dated September 9, 1947.

An object of the present invention is the provision of an epicyclic drive which can be directly connected to a prime mover, and adapted to transform the rotary motion of said prime mover into reciprocative motion at reduced speed, said reciprocations being in definite time relation to said rotary motion.

In the earlier application the subject matter related to an epicyclic drive in which an outwardly facing inner race was driven by the prime mover, and maintained in eccentric relation to this race was an inwardly facing outer race. Between and in rolling contact with these races was a single ball or roller, and the means for maintaining the races in eccentricity also maintained the ball or roller in rolling contact with the races. However, in such an arrangement a member reciprocated by the outer race was not maintained in any definite timed relation to the rotation of the prime mover shaft.

According to the present invention, the rotary member is positively connected to the reciprocative member by means of gearing and consequently there is no chance for any of the elements to slip and upset the timing relation of the members.

Another object of the invention is the provision of an epicyclic drive, of a reciprocative member having inwardly facing teeth annularly disposed to form an internal gear, a pinion maintained in eccentric relation to said member and driven by a prime mover, and a second (dirigible) pinion between and having its pitch circle tangent to the pitch circles of said internal gear and said first pinion at the points of greatest eccentricity.

A further object of the invention is the provision in an epicyclic drive, of a hollow housing having a pair of spaced internal gears therein, a shaft maintained in eccentric relation to said internal gears, a pinion on said shaft and lying on a plane cutting the space between said internal gears, a second pinion meshing with said first pinion and of such diameter that it extends between said internal gears, a smaller pinion positioned on one side of and driven by said second pinion and meshing with one of said internal gears, and a second smaller pinion positioned on the opposite side of and driven by said second pinion and meshing with the other of

2 said internal gears, thereby providing a drive embodying compound reduction between the rotary speed of a prime mover connected to said shaft and a reciprocative member associated with said hollow housing.

Other objects and advantages of the invention will become apparent to those skilled in the art after a study of the following specification and the accompanying drawings.

Referring to the drawings.

Figure 1:
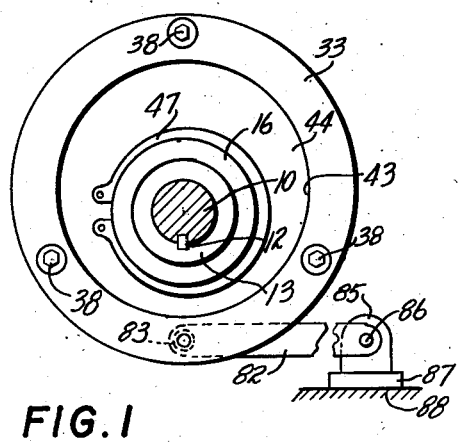
Figure 1 is an end elevation of an epicyclic drive given by way of example to illustrate the invention.
Figure 2:
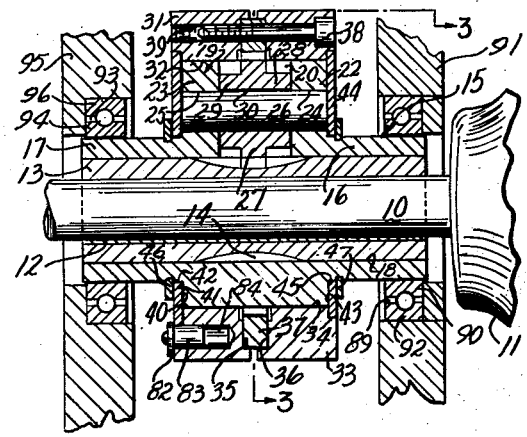
Figure 2 is a sectional elevation as seen on a central vertical plane extending through the embodiment shown in Figure 1.
Figure 3:
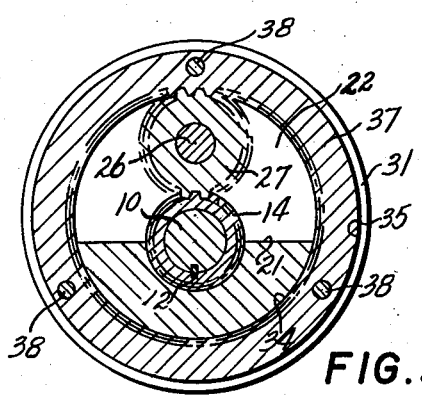
Figure 3 is a sectional elevation taken along the lines 3—3 of Figure 2.

Referring first to Figures 1, 2, and 3, a shaft 10 of a prime mover such as an electric motor 11, has keyed thereto, by means of a key 12, a sleeve 13 having gear teeth 14 formed therein intermediate the ends thereof. A rotor 15 has bosses 16 and 17 in alignment with one another, and a hole 18 therein forms a working fit on the sleeve member 13. Formed integral with the bosses 16 and 17 is an intermediate eccentric portion 19 having a transverse slot 20 formed therein intermediate the ends thereof, said slot terminating along a line to form a flat surface 21 thereby providing spaced eccentric portions 22 and 23 having aligned holes 24 and 25 respectively formed therein.

Forming a press fit in the holes 24 and 25 is a pin 26.

A pinion 27 preferably has formed integral therewith hubs 28 and 29, and a hole 30 formed therein forms a working fit on the pin 26.

A ring member 31 has a bore 32 formed therein and forming a working fit on the eccentric portion 19. A second ring member 33, similar to the ring member 31, has a bore 34 formed therein which also forms a working fit on the eccentric portion 19.

The ring member 31 has a counterbore 35 formed therein and the ring member 33 has a corresponding counterbore 36 formed therein and positioned in these counterbores is an internal ring gear 37. The thickness of the ring gear 37 is preferably greater than the combined depths of the counterbores 35 and 36 so that when the ring members 31 and 33 are clamped together by means of screws, such as the screw 38 passing through the ring member 33 engaging threaded holes such as the threaded hole 39 formed in the ring member 31, a unitary structure is formed.

The aligned holes 24 and 25 formed in the eccentric portion 19 preferably have their centers lying on a radial plane cutting the eccentric portion at its point of greatest eccentricity. The pitch circle of the pinion 27 is tangent to both the pitch circle of the teeth 14 formed on the sleeve 13 and the pitch circle of the teeth formed in the internal ring gear 37.

The ring member 31 has a counterbore 40 formed in its face opposite the counterbore 35, and positioned in said counterbore is a disc 41 which has an eccentric hole 42 formed therein and engaging the external surface of the boss 17. Likewise the ring member 33 has a counterbore 43 formed therein to accommodate a disc 44 which has an eccentric hole 45 formed therein to engage the surface of the boss 16. The boss 17 has a groove formed therein to accommodate a snap ring 46 for retaining the disc 41 in the counterbore 40. Likewise the boss 16 has a groove formed therein to accommodate a snap ring 47 for retaining the disc 44 in the counterbore 43.

Figure 5:
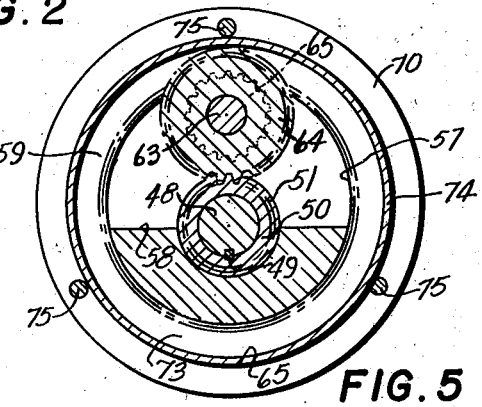
Figure 5 is a sectional elevation as seen along the lines 5—5 of Figure 4.
Figure 4:
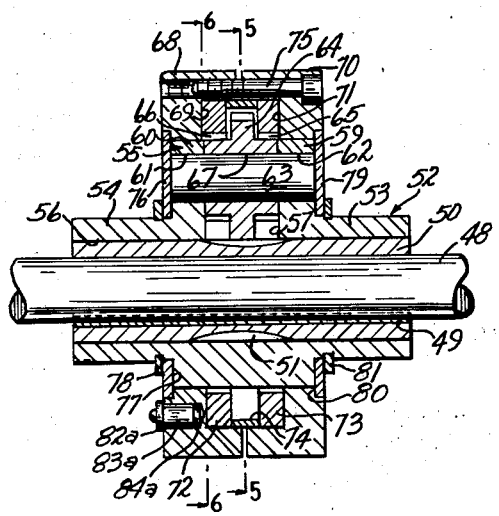
Figure 4 is a sectional elevation of a modification of the arrangement shown in Figure 2 wherein the drive is compounded to obtain a greater reduction in the ratio between the high speed rotary drive and the reciprocative driven member.
Figure 6:
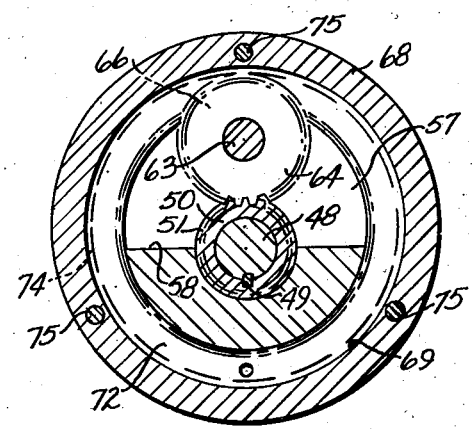
Figure 6 is a sectional elevation taken along the lines 6—6 of Figure 4.

Referring now to Figures 4, 5, and 6, a shaft 48, which may be driven by any source of power, carries a key 49. Keyed to the shaft 48 by means of the key 49 is a sleeve 50 which has gear teeth 51 formed therein intermediate the ends thereof. A member 52 has aligned bosses 53 and 54, and an intermediate eccentric portion 55 formed integral therewith, and a hole 56 therethrough forms a working fit on the outer surface of the sleeve member 50.

Formed in the eccentric portion 55 is a slot 57 which terminates on a line 58 as shown in Figures 5 and 6, dividing the upper portion of the eccentric into spaced webs 59 and 50. These webs have aligned holes 61 and 62 formed therein, and a pin 63 is mounted in these holes with a forced fit. A triple pinion consists of a central pinion 64 of one diameter, with smaller pinions 65 and 66 on each side thereof. These pinions have a central hole 67 formed therein which hole forms a working fit on the pin 63. The central pinion 64 meshes with the teeth 51 formed in the sleeve member 50.

A ring member 68 has a counterbore 69 formed therein and a second ring member 70 has a counterbore 71 formed therein. These counterbores face each other and positioned therein are internal gear rings 72 and 73 with a spacer ring 74 therebetween. The sum of the depths of the counterbores 69 and 71 is less than the sum of the thicknesses of the gear rings 72, 73, and the spacer ring 74. Also the axial length of the spacer ring 74 is greater than the thickness of the central pinion 64 so as to provide clearance for said central pinion.

It was stated that the central pinion 64 meshes only with the teeth 51 formed in the sleeve member 50, therefore the pinion 64 will rotate at a speed equal to the ratio of the pitch diameter of the teeth 51 and the pitch diameter of the pinion 64. Now the pinion 65 meshes with the teeth of the internal gear 73 and the pinion 66 meshes with the teeth of the internal gear 72. The pitch diameters of the pinions 65 and 66 are identical and likewise the pitch diameters of the internal gears 72 and 73 are identical so it will be seen that the use of two pinions 65 and 66 is merely to produce a balanced arrangement as obviously the drive would function in substantially the same manner if, for example, the pinion 66 and the internal gear 72 were omitted.

Since the pinion 64 is driven at a reduced speed by the teeth 51, and since the pinions 65 and 66 are smaller in diameter, and since they in turn drive the internal gears 72 and 73, I have provided a compound reduction between the sleeve member 50 and the ring members 68 and 70 which incidentally are secured together by means of screws 75 clamping the ring member 68 and 70, and the internal gears 72, 73, and the sleeve 74, together to form a unitary structure.

A disc 76 similar to the disc 41 is positioned in a counterbore 77 formed in the ring member 68 and is retained therein by means of a snap ring 78 snapped into a groove formed in the boss 54. A similar disc 79 is positioned in the counterbore 80 formed in the ring member 70 and is retained therein by means of a snap ring 81 engaging a groove formed in the boss 53.

In each of the above modifications if the unitary structure comprised of the rings 31 and 33 of Figure 2, with the internal gear 37 clamped therebetween, or the unitary structure of Figure 4 comprised of the rings 68 and 70 with the internal rings 72 and 73, and the spacer ring 74 are held against rotation, they move on an orbital path and reciprocatory motion may be imparted to any member connected thereto in any suitable manner. One means for preventing these structures from rotating is shown in Figures 1 and 2 and comprises a lever 82 having one end journaled on a stud 83 which is forced into a hole 84 formed in the ring member 31 and the other end connected to a boss 85 through a pivot 86. The boss 85 may have a base 87 positively secured to a support 88.

In the modification shown in Figures 4, 5, and 6, the stud 83a is pressed into a hole 84a and the lever 82a is pivotally connected to a stud 83a; the other end of the lever may be treated in the same manner as described in connection with Figures 1 and 2.

In either of the modifications herein shown and described, the drive may be carried on frictionless bearings in a suitable support. As such an arrangement is shown in Figure 2, it is not believed necessary to repeat the showing in Figure 4.

According to Figure 2, a frictionless bearing 89 has its inner race 90 engaging the boss 16, a leg 91 of a support extends parallel to the drive and is counterbored to accommodate the outer race 92 of the ball bearing 89. Likewise the boss 17 supports the inner race 94 of a ball bearing 93. The support may have a second extension 95 parallel to the sides of the drive and this support may be counterbored to accommodate the outer race 96 of the ball bearing 93. Since the counterbores in the legs 91 and 95 face each other it is obvious that it is necessary that at least one of them be removably carried on the main support in order to get the bearings into the counterbores when they are positioned on the drive as shown.

Although I have herein shown and described, by way of example, one embodiment of the invention and a modification thereof, it is obvious

What is claimed is:

1. In an epicyclic drive, a shaft forming a driving member, a pinion movable with said shaft, a hollow housing having an internal gear fixed therein and at least one annular surface concentric with and axially spaced apart from said internal gear, said housing constituting a driven member, said pinion and said internal gear being in alignment with each other, means engaging said shaft and said annular surface for maintaining them in eccentric relation, a second pinion journaled in said last means between and meshed with both said pinion and said internal gear, and means restraining said housing against rotation, thereby causing said housing to move in an orbital path about said shaft at a speed less than the speed of said shaft when the latter is rotated.

2. In an epicyclic drive, a member adapted to be connected to a prime mover and forming a driving member, a pinion fixed on said member and movable therewith, a hollow housing having an internal gear fixed therein in alignment with said pinion and annular surfaces concentric with and positioned on either side of said gear, said housing constituting a driven member, an eccentric member having a bearing therein journaled on said shaft and having an exterior surface engaging said annular surfaces for maintaining said drive member and said driven member in eccentric relation, a second pinion journaled in said eccentric member between and meshed with said first mentioned pinion and said internal gear, and means for restraining said housing against rotation, thereby causing said driven member to move in an orbital path about said driving member at a speed less than the speed of said driving member when the latter is rotated.

3. In an epicyclic drive, a shaft forming a driving member, a pinion movable with said shaft, an internal gear in alignment with said pinion, supporting means to which said gear is secured, means cooperating with said shaft and said gear for maintaining them in eccentric relationship, pinion means supported by said last means and meshing with both said pinion and said internal gear, and means restraining said supporting means and said gear against rotation.

4. In an epicyclic drive, a hollow housing having an internal gear fixed therein and an annular surface concentric with and axially spaced apart from said internal gear, said housing constituting a driven member, a shaft parallel to the axis of said gear, a pinion on said shaft in alignment with said gear, means journaled on said shaft and in said annular surface for maintaining said pinion and said internal gear in eccentric relation with each other, pinion means rotatably supported on said last means and meshing with both said pinion and said internal gear, and means for restraining said housing against rotation, thereby causing the latter to move on an orbital path as said pinion is rotated.

5. In an epicyclic drive, a hollow housing having an inwardly facing internal gear secured therein, aligned holes formed in said housing concentric with each other and having their axes coinciding with the axis of said internal gear, a shaft having its axis parallel to the axes of said holes, a pinion formed on said shaft in alignment with said internal gear, an eccentric body journaled on said shaft and journaled in said aligned holes for maintaining said internal gear and said pinion in eccentric relation with each other, means forming a cavity in said eccentric body, said cavity extending to the point of greatest eccentricity, pinion means rotatably supported in said cavity and meshing with both said pinion and said internal gear and means restraining said housing against rotation, thereby causing said hollow housing to oscillate as said shaft is rotated.

6. In an epicyclic drive, a reciprocative member having an interior annular bore, an internal ring gear secured in said member intermediate the ends of said annular bore, said gear having its pitch circle concentric with said bore, a shaft having its axis parallel to the axis of said bore, a series of teeth formed on said shaft and constituting a pinion, said pinion being in alignment with said internal gear, means journaled on said shaft and in said bore for maintaining said shaft and said bore in eccentric relation to each other, and a second pinion journaled in said last mentioned means and having its pitch circle tangent to both the pitch circle of said first pinion and said ring gear, the axis of the pitch circle of said second pinion lying on a radial line extending from the point of greatest eccentricity of said means to the center of said shaft.

7. An epicyclic drive according to claim 6, in which said reciprocative member is comprised of a pair of counterbored ring members rigidly secured together with said counterbores engaging an annular internal ring gear.

8. The invention according to claim 6, in which said means journaled on the shaft and in said bore constitutes an eccentric member the interior bore of which is journaled on said shaft and the exterior surface of which is journaled in said bore, said eccentric member having a clearance cavity formed therein and extending from the point of greatest eccentricity to a point substantially below the point where the pitch circles of both said pinions are tangent, thereby providing substantial clearance for said second pinion.

9. In an epicyclic drive, a member adapted to be connected to a prime mover and forming a driving member, a pinion on said member and movable therewith, a hollow housing having an internal gear fixed therein in alignment with pinion and annular surfaces concentric with and positioned on either side of said internal gear, said housing constituting a driven member, means connected to said driven member restraining it against rotation, an eccentric member having a bearing therein journaled on said shaft and having an exterior surface engaging said annular surfaces for maintaining said drive member and said driven member in eccentric relation said member having bosses on both ends concentric with the bearing therein and having grooves formed therein in spaced relation to the ends of said eccentric member, a second pinion journaled in said eccentric member between and meshed with said first mentioned pinion, and said internal gear, closure discs mounted on said bosses to enclose said eccentric member and the interior of said hollow housing, said discs having holes therein eccentric with the outer diameters thereof and fitting said bosses, and snap rings in each of said grooves for retaining said discs on said bosses.

10. In an epicyclic drive, a hollow housing having an internal gear fixed therein and an annular bore on either side thereof and concentric therewith, said housing constituting a driven member, means connected to said housing for restraining it against rotation, a shaft comprising a driving member, a pinion on said shaft in alignment with said gear, an eccentric member adapted to be journaled in said annular surfaces and having a bore eccentric to its external diameter and adapted to be journaled on said shaft, a clearance passage formed in said eccentric member at right angles to the axis thereof and bounded by two spaced web portions of said member, aligned holes formed in said webs, shaft means supported in said aligned holes, and a pinion supported on said shaft means and meshing with both said first pinion and said internal gear.

11. In an epicyclic drive, a shaft forming a driving member, a pinion movable with said shaft, a hollow housing having an internal gear fixed therein and at least one annular surface concentric with and axially spaced apart from said internal gear, said housing constituting a driven member, means cooperating with said shaft and with said bore for maintaining said shaft and said housing in eccentric relationship, at least two additional pinions journaled in said last mentioned means, one of said last pinions having its pitch circle tangent to the pitch circle of said first mentioned pinion and the other of said last pinions having its pitch circle tangent to the pitch circle of said ring gear, and means restraining said housing against rotation.

12. An epicyclic drive according to claim 2, in which said eccentric member has formed integral therewith oppositely extending bosses concentric with the bearing in said eccentric member, and in which frictionless bearings are mounted on said bosses, and aligned sockets formed in a support for said drive and adapted to engage and support the outer races of said frictionless bearings and thereby support said drive.

13. The invention according to claim 5, in which said eccentric body has opposed extensions embracing said shaft and concentric therewith, a support for said drive having aligned holes therein, and frictionless bearings having their outer races supported in said aligned holes and having their inner races mounted on said extensions.

14. In an epicyclic drive, a shaft forming a driving member, said shaft having a pinion formed thereon intermediate the ends thereof, a hollow housing having an assembly comprising a pair of spaced internal gears fixed therein with spacer means therebetween, said housing having annular surfaces therein on either side of said assembly and concentric with said internal gears, means connected to said housing for restraining it against rotation, an eccentric member journaled on said shaft and having its exterior surface engaging said annular surfaces for maintaining said internal gears and said pinion in eccentric relationship, means forming a cavity in said eccentric member, said cavity being bounded by spaced webs of said eccentric member extending to the point of greatest eccentricity, aligned holes formed in said webs parallel to said shaft, a second shaft supported in said aligned holes, and pinion means carried on said second shaft and constituting a second pinion meshing with said first pinion and a third and fourth pinion meshing with said internal gears.

15. The invention according to claim 14, in which said third and said fourth pinions are smaller in diameter than said second pinion.

16. The invention according to claim 14, in which said eccentric body has bosses on both ends concentric with the bearing on said shaft, said bosses having grooves formed therein in spaced relation to the ends of said eccentric member; in which a counterbore is formed in each end of said hollow housing in which closure discs are mounted on said bosses and positioned within said counterbores; and in which snap rings in each of said grooves retain said discs on said bosses, thereby forming a dust tight closure for said drive.

17. In an epicyclic drive, a shaft forming a driving member, a pinion movable with said shaft, a hollow housing having an internal gear fixed therein and spaced axially from said pinion, said housing constituting a driven member, means connected to said housing for restraining it against rotation, means cooperating with said shaft and with said bore for maintaining said shaft and said housing in eccentric relationship, compound gearing means carried by said last mentioned means and engaging both said pinion and said internal gear for causing said hollow housing to move on an orbital path at a number of gyrations per minute substantially less than the number of revolutions per minute of said shaft.

18. The invention according to claim 17, in which closure means is provided engaging said means cooperating with said shaft and said bore, and engaging said hollow housing to enclose said pinion, said internal gear and said compound gearing means.

LINDSAY H. BROWNE.

REFERENCES CITED

The following references are of record in the file of this patent:

UNITED STATES PATENTS

| Number | Name | Date |
|---|---|---|
| 303,513 | Harvey et al. | Aug. 12, 1884 |
| 572,038 | Whitcomb | Nov. 24, 1896 |
| 605,845 | Belanger | June 21, 1898 |

FOREIGN PATENTS

| Number | Country | Date |
|---|---|---|
| 345,178 | Germany | Apr. 27, 1920 |